US011287928B2

(12) United States Patent
Huang

(10) Patent No.: US 11,287,928 B2
(45) Date of Patent: Mar. 29, 2022

(54) TOUCH DISPLAY DEVICE AND TOUCH DISPLAY

(71) Applicant: WUHAN CHINA STAR OPTOELECTRONICS TECHNOLOGY CO., LTD., Hubei (CN)

(72) Inventor: Yaoli Huang, Hubei (CN)

(73) Assignee: WUHAN CHINA STAR OPTOELECTRONICS TECHNOLOGY CO., LTD., Hubei (CN)

(*) Notice: Subject to any disclaimer, the term of this patent is extended or adjusted under 35 U.S.C. 154(b) by 202 days.

(21) Appl. No.: 16/625,773

(22) PCT Filed: Nov. 5, 2019

(86) PCT No.: PCT/CN2019/115542
§ 371 (c)(1),
(2) Date: Dec. 23, 2019

(87) PCT Pub. No.: WO2021/012462
PCT Pub. Date: Jan. 28, 2021

(65) Prior Publication Data
US 2021/0333976 A1    Oct. 28, 2021

(30) Foreign Application Priority Data
Jul. 24, 2019   (CN) .......................... 201910670878.9

(51) Int. Cl.
*G06F 3/041* (2006.01)
*G06F 3/044* (2006.01)
(Continued)

(52) U.S. Cl.
CPC ....... *G06F 3/04184* (2019.05); *G02B 6/0088* (2013.01); *G02F 1/1368* (2013.01);
(Continued)

(58) Field of Classification Search
CPC .......... G02F 1/13338; G02F 1/133512; G02F 1/133514; G02F 1/1368; G06F 3/04184; G06F 3/0446; G06F 3/0412; G02B 6/0088
(Continued)

(56) References Cited

U.S. PATENT DOCUMENTS

2017/0235400 A1* 8/2017 Ding ................... G06F 3/04166
345/174
2018/0113343 A1 4/2018 Huang et al.

FOREIGN PATENT DOCUMENTS

| CN | 204965387 U | 1/2016 |
|---|---|---|
| CN | 105676509 A | 6/2016 |
| CN | 106708338 A | 5/2017 |

* cited by examiner

*Primary Examiner* — Nathanael R Briggs
*Assistant Examiner* — William D Peterson
(74) *Attorney, Agent, or Firm* — Soroker Agmon Nordman

(57) ABSTRACT

A touch display device and a touch display are provided. The touch display device includes a touch electrode and a backlight module disposed opposite to the touch electrode. The backlight module includes a backlight film and a backlight iron frame supporting the backlight film. The backlight film is disposed between the touch electrode and the backlight iron frame; and the touch electrode and the backlight iron frame are electrically connected to a touch signal terminal. The touch signal terminal is configured to transmit a touch signal to the touch electrode and the backlight iron frame. The touch electrode and the backlight iron frame receive a same touch signal, thereby eliminating the capacitance coupling effect between the touch electrode and the backlight iron frame, increasing touch sensitivity, and reducing vibration noise of the backlight film. The touch (Continued)

display includes the touch display device, and has advantages of the touch display device.

19 Claims, 3 Drawing Sheets

(51) Int. Cl.
*F21V 8/00* (2006.01)
*G02F 1/1333* (2006.01)
*G02F 1/1335* (2006.01)
*G02F 1/1368* (2006.01)

(52) U.S. Cl.
CPC .... *G02F 1/13338* (2013.01); *G02F 1/133512* (2013.01); *G02F 1/133514* (2013.01); *G06F 3/0412* (2013.01); *G06F 3/0446* (2019.05)

(58) Field of Classification Search
USPC .......................................................... 349/12
See application file for complete search history.

TOUCH DISPLAY DEVICE AND TOUCH DISPLAY

BACKGROUND OF INVENTION

Field of Invention

The present invention belongs to the technical field of the touch display, in particular, to a touch display device and a touch display.

Description of Prior Art

In-cell touch displays integrate touch electrodes into display panels and enable touch functions and display functions of the display panels using a time division driving method. By the in-cell touch technology, there is no need to separately manufacture the touch function layer after the display panel process, such that the process of the touch display device can be simplified, and the design of thinner display devices can be achieved. Therefore, for the touch display devices, the in-cell touch scheme is mainly focused now.

In-cell touch technology is widely used in liquid crystal display devices, but there are also many problems. One of the most serious problems is parasitic capacitance between the touch electrodes and the backlight iron frames. Referring to FIG. 1, the liquid crystal display device 10 includes liquid crystal panel LC1 and backlight module BL1. The touch electrode 11 is integrated in the liquid crystal display panel LC1. The backlight module BL1 includes backlight film 13 and backlit iron frame 12 supporting the backlight film 13. Virtual capacitor C is formed between the touch electrode 11 and the backlight iron frame 12. Due to the capacitive coupling effect of the virtual capacitor C, the periodic touch signal received on the touch electrode 11 will trigger the charging and discharging action in the virtual capacitor C, thereby affecting the time of the charging and discharging action in the touch electrode 11 triggered by the touch signal, and then affecting the touch effect. In addition, the periodic charging and discharging action in the virtual capacitor C triggered by the touch signal will induce vibration of the backlight film layer 13 disposed in the virtual capacitor C, thereby resulting in high frequency noise and affecting the use effect of the product.

SUMMARY OF INVENTION

Technical Problem

In touch display devices, virtual capacitors will be formed between touch electrodes and backlight iron frames. The periodic touch signals received on the touch electrodes will trigger the charging and discharging action in the virtual capacitors, thereby affecting the time of the charging and discharging action in the touch electrodes triggered by the touch signals. In addition, the periodic charging and discharging action in the virtual capacitors triggered by the touch signals will induce vibration of the backlight films, thereby resulting in high frequency noise.

Technical Problem

In order to solve the above problems, the solution of the present invention is as follows.

The present invention provides a touch display device including:

a touch electrode electrically connected to a touch signal terminal; and a backlight module disposed opposite to the touch electrode, in which the backlight module includes a backlight film and a backlight iron frame supporting the backlight film, the backlight film is disposed between the touch electrode and the backlight iron frame, the backlight iron frame is electrically connected to the touch signal terminal, and the touch signal terminal is configured to transmit a touch signal to the touch electrode and the backlight iron frame.

In one embodiment of the touch display device of the present invention, the touch signal terminal is configured to transmit a same touch signal to the touch electrode and the backlight iron frame.

In one embodiment of the touch display device of the present invention, the touch signal transmitted from the touch signal terminal to the touch electrode and the backlight iron frame is a square-wave signal.

In one embodiment of the touch display device of the present invention, the touch signal terminal is electrically connected to a touch chip, and the touch chip is configured to emit a touch signal to the touch signal terminal.

In one embodiment of the touch display device of the present invention, the touch display device further includes a liquid crystal display panel, in which the liquid crystal display panel includes an array substrate, a color filter disposed opposite to the array substrate, and a liquid crystal layer disposed between the array substrate and the color filter, and the touch electrode is integrated in the liquid crystal display panel.

In one embodiment of the touch display device of the present invention, the touch electrode is integrated in the array substrate.

In one embodiment of the touch display device of the present invention, the touch electrode is integrated in a side of the array substrate close to the liquid crystal layer.

In one embodiment of the touch display device of the present invention, the touch electrode is integrated in a side of the array substrate away from the liquid crystal layer.

In one embodiment of the touch display device of the present invention, the touch electrode is integrated in an inner of the array substrate.

In one embodiment of the touch display device of the present invention, the touch electrode is integrated in the color filter.

In one embodiment of the touch display device of the present invention, the touch electrode is integrated in a side of the color filter close to the liquid crystal layer.

In one embodiment of the touch display device of the present invention, the touch electrode is integrated in a side of the color filter away from the liquid crystal layer.

In one embodiment of the touch display device of the present invention, the touch electrode is integrated in an inner of the color filter.

In one embodiment of the touch display device of the present invention, the array substrate includes a plurality of pixel units that are arranged in an array, a plurality of thin film transistors, and a metal trace, and the color filter includes three color resist units, which are a red resist unit, a green resist unit, and a blue resist unit, arranged in an array, and a black matrix disposed between two adjacent color resist units.

In one embodiment of the touch display device of the present invention, the touch electrode includes one or more touch modules, and each of the touch modules is individually electrically connected to the touch signal terminal.

In one embodiment of the touch display device of the present invention, the backlight film includes a light guide layer, and the light guide layer is configured to conduct or diffuse a light emitted from the backlight module.

In one embodiment of the touch display device of the present invention, the backlight film includes a light guide plate configured to conduct light and a diffusion plate configured to diffuse light.

In one embodiment of the touch display device of the present invention, the backlight iron frame is grounded.

The present invention also provides a touch display including:

a liquid crystal display panel, in which the liquid crystal display panel includes an array substrate, a color filter disposed opposite to the array substrate, and a liquid crystal layer disposed between the array substrate and the color filter; and a backlight module disposed at a backside of the liquid crystal display panel and configured to provide a backlight for the liquid crystal display panel, in which the backlight module includes a backlight film and a backlight iron frame supporting the backlight film, and the backlight film is disposed between the liquid crystal display panel and the backlight iron frame; and there is a touch electrode disposed in the liquid crystal display panel, and the touch electrode and the backlight iron frame are electrically connected to a touch signal terminal, in which the touch signal terminal is configured to transmit a touch signal to the touch electrode and the backlight iron frame.

Benefits

In the touch display device and the touch display provided in the present invention, the touch electrode and the backlight iron frame are electrically connected to the touch signal terminal, such that the touch signal can simultaneously trigger the charging and discharging action in the touch electrode and the backlight iron frame, ensuring that the touch electrode and the backlight iron frame always have the same voltage, thereby eliminating the capacitance coupling effect between the touch electrode and the backlight iron frame, achieving the effects that the touch sensitivity of the touch display device and the touch display is increased and the vibration noise of the backlight film is reduced, and improving the quality of the touch display device and the touch display.

BRIEF DESCRIPTION OF DRAWINGS

In order to more clearly illustrate the embodiments of the present invention or the technical solution in the prior art, the drawings used for describing the embodiments or the prior art are briefly described below. It is obvious that the following drawings are only some embodiments of the present invention. For a person skilled in the art can infer other drawings according to these drawings without creative effort.

DETAILED DESCRIPTION OF PREFERRED EMBODIMENTS

Figure 1:
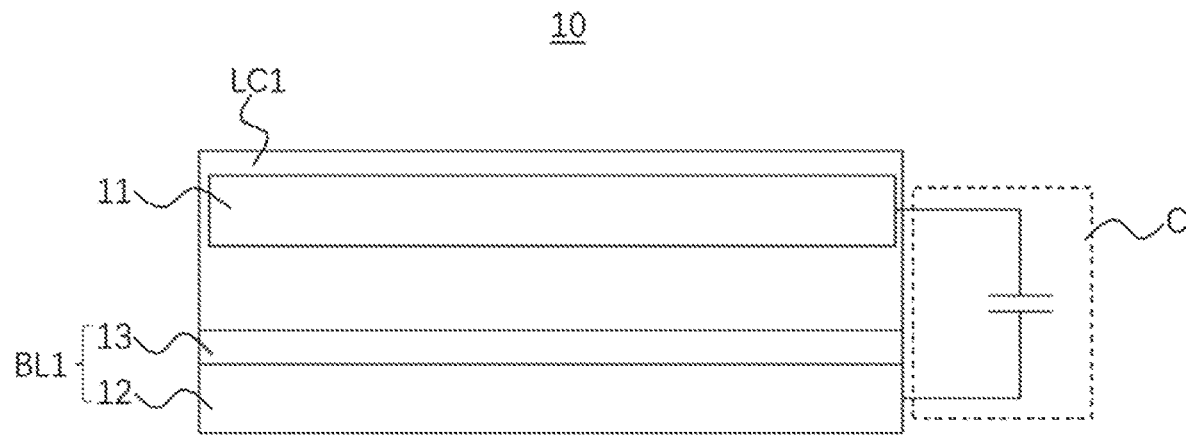
FIG. 1 is a schematic diagram of a touch display device in the prior art.

The following description of the embodiments is provided by reference to the following drawings, in order to illustrate the specific embodiments that can be carried out by the present invention. Directional terms mentioned in the present invention, such as "up," "down," "forward," "backward," "left," "right," "inside," "outside," "side," etc., are merely indicated the direction of the drawings. Therefore, the directional terms are used for illustrating and understanding of the present invention rather than limiting thereof. In the figures, elements with similar structure are indicated by the same reference numerals.

In the touch display device provided in one embodiment of the present invention, the touch electrode and the backlight iron frame of the touch display device are electrically connected to the touch signal terminal, such that the touch signal can simultaneously trigger the charging and discharging action in the touch electrode and the backlight iron frame, thereby solving the problems that the touch effect is damaged due to the virtual capacitor formed between the touch electrode and the backlight iron frame and the noise is generated.

Figure 2:
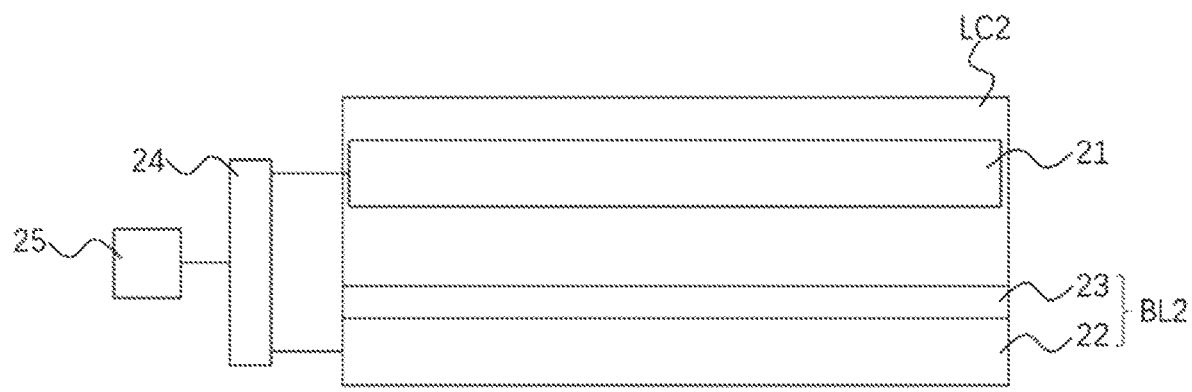
FIG. 2 is a schematic diagram of the touch display device provided in one embodiment of the present invention.

FIG. 2 shows a schematic diagram of the touch display device provided in one embodiment of the present invention. The touch display device includes a touch electrode 21 integrated in a display panel LC2 and a backlight module BL2 disposed opposite to the touch electrode 21. The touch electrode 21 is configured to enable the touch function of the touch display device, and the backlight module BL2 is configured to provide a backlight for the display panel LC2, in order to enable the display function of the display panel LC2.

The backlight module BL2 includes a backlight film 23 and a backlight iron frame 22 configured to support the backlight film 23. The backlight film 23 is disposed between the backlight iron frame 22 and the touch electrode 21. The backlight film 23 includes a light emitting film and a light guide film that are configured to enable the light emitting function and the light guide function of the backlight module BL2. Optionally, the backlight film 23 includes a light guide layer, and the light guide layer includes a light guide plate configured to conduct light and a diffusion plate configured to diffuse light, ensuring that the backlight module BL2 provides uniform and stable light for the display panel LC2. The backlight iron frame 22 can be made of iron or other metal(s). The backlight iron frame 22 is grounded, in order to eliminate the static electricity generated on the surface of the backlight iron frame 22.

The touch electrode 21 and the backlight iron frame 22 are both electrically connected to a touch signal terminal 24. The touch signal terminal 24 is configured to transmit a touch signal to the touch electrode 21 and the backlight iron frame 22. Preferably, the touch signal terminal 24 simultaneously transmits a same touch signal to the touch electrode 21 and the backlight iron frame 22. It shall be understood that if the same touch signal (e.g., voltage signal) appears on the touch electrode 21 and the backlight iron frame 22, the capacitance coupling effect between the touch electrode 21 and the backlight iron frame 22 will not be generated. That is to say, the risk that a virtual capacitor is formed between the touch electrode 21 and the backlight iron frame 22 is avoided. Since the charging and discharging action in the virtual capacitor triggered by the touch signal is avoided, the touch sensitivity of the touch display device can be assured, and the problem that the noise generated from the backlight film 23 affected by the periodic electric field can be solved.

It is to be noted that the material of the backlight iron frame 22 of the present invention is not limited to iron, it can be other metal or alloy.

Figure 3:
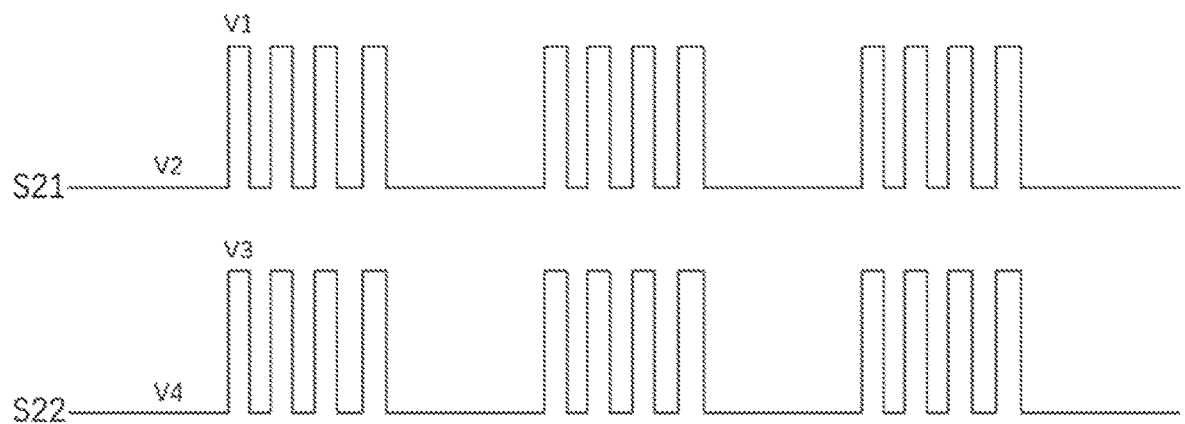
FIG. 3 is a time sequence diagram of a touch signal on a touch electrode and the backlight iron frame of the touch display device provided in one embodiment of the present invention.

Optionally, referring to FIGS. 2 and 3, the touch signal transmitted from the touch signal terminal 24 to the touch electrode is first signal S21. The first signal S21 is a periodic square-wave signal, and the first signal S21 includes first high voltage V1 and first low voltage V2. The touch signal transmitted from the touch signal terminal 24 to the backlight iron frame 22 is second signal S22. The second signal S22 is a periodic square-wave signal, and the second signal S22 includes second high voltage V3 and second low voltage V4. The first signal S21 and the second signal S22 have the same time sequence, and V1=V3, V2=V4, such that the touch electrode 21 and the backlight iron frame 22 always have the same voltage.

Further, referring to FIG. 2, the touch signal terminal 24 is electrically connected to a touch chip 25. The touch chip 25 is configured to emit a touch signal to the touch signal terminal 24. Optionally, the touch chip 25 and the touch signal terminal 24 can be disposed in the non-display region, or at the backside or in the inner of the display region of the touch display device. The touch chip 25 and the touch signal terminal 24 can be integrated in the display panel LC2 or on the backlight module BL2.

Figure 4:
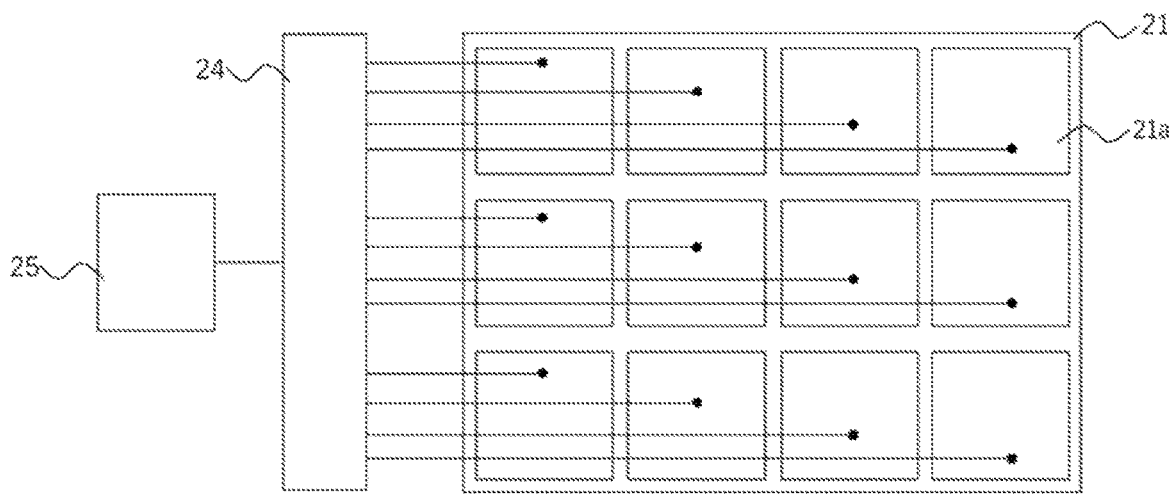
FIG. 4 is a schematic diagram of the structure of the touch electrode including a plurality of touch modules provided in one embodiment of the present invention.

Optionally, as shown in FIG. 4, the touch electrode 21 includes a plurality of touch modules 21a, in which each of the touch modules 21a is individually electrically connected to the touch signal terminal 24 via a wire, and the touch signal terminal 24 is electrically connected to the touch chip 25. For the touch assay, the touch chip 25 emits a touch signal to each of the touch modules 21a through the touch signal terminal 24, and then the touch function of the touch display device can be achieved by examining the signal changes of each of the touch modules 21a and then determining the touch position.

In the touch display device provided in one embodiment of the present invention, the touch electrode 21 and the backlight iron frame 22 are electrically connected to the touch signal terminal 24, such that the touch signal can simultaneously trigger the charging and discharging action in the touch electrode 21 and the backlight iron frame 22, thereby eliminating the charging and discharging action triggered by the touch signal in the virtual capacitor formed between the touch electrode 21 and the backlight iron frame 22, increasing the touch sensitivity of the touch display device, and solving the problem that the noise is generated from the backlight film 23 due to the periodic change of the electric field.

Figure 5:
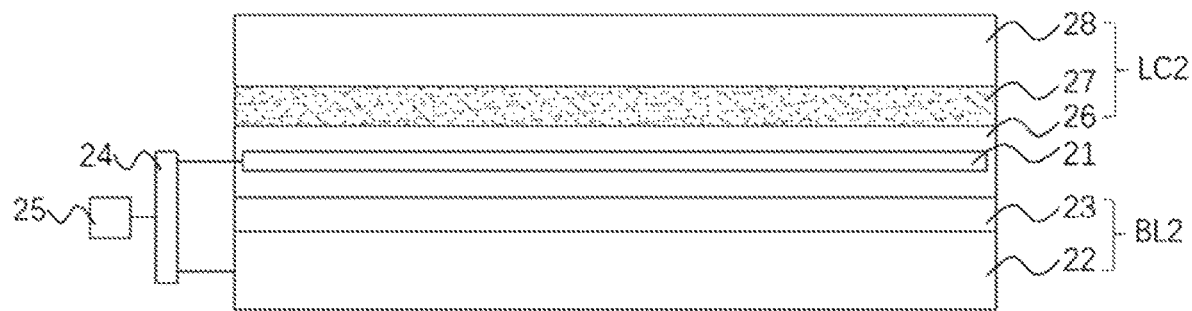
FIG. 5 is a schematic diagram of a touch display device provided in another embodiment of the present invention, in which a touch electrode is integrated in the array substrate.

In one embodiment of the present invention, referring to FIG. 5, the display panel LC2 is a liquid crystal display panel. The display panel LC2 includes an array substrate 26, a color filter 28 disposed opposite to the array substrate 26, and a liquid crystal layer 27 disposed between the array substrate 26 and the color filter 28.

The touch electrode 21 is integrated in the array substrate 26. The backlight module BL2 is disposed at a backside of the display panel LC2 and configured to provide a backlight for the display panel LC2. The backlight module BL2 includes a backlight film 23 and a backlight iron frame 22 configured to support the backlight film 23. The backlight film 23 is disposed between the backlight iron frame 22 and the array substrate 26. The backlight film 23 includes a light emitting film and a light guide film that are configured to enable the light emitting function and the light guide function of the backlight module BL2. Optionally, the backlight film 23 includes a light guide layer, in which the light guide layer includes a light guide plate configured to conduct light and a diffusion plate configured to diffuse light, ensuring that the backlight module BL2 provides uniform and stable light for the display panel LC2. The backlight iron frame 22 can be made of iron or other metal(s). The backlight iron frame 22 is grounded, in order to eliminate the static electricity generated on the surface of the backlight iron frame 22.

The touch electrode 21 and the backlight iron frame 22 are both electrically connected to the touch signal terminal 24. The touch signal terminal 24 is electrically connected to the touch chip 25. The touch chip 25 transmits a touch signal to the touch electrode 21 and the backlight iron frame 22 through the touch signal terminal 24. Preferably, the touch chip 25 simultaneously transmits the same touch signal to the touch electrode 21 and the backlight iron frame 22. It shall be understood that if the same touch signal (e.g., voltage signal) appears on the touch electrode 21 and the backlight iron frame 22, the capacitance coupling effect between the touch electrode 21 and the backlight iron frame 22 will not be generated. That is to say, the risk that a virtual capacitor is formed between the touch electrode 21 and the backlight iron frame 22 is avoided. Since the charging and discharging action in the virtual capacitor triggered by the touch signal is avoided, the touch sensitivity of the touch display device can be assured, and the problem that the noise is generated from the backlight film 23 affected by the periodic electric field can be solved.

Optionally, the array substrate 26 includes a plurality of pixel units that are arranged in an array, a plurality of thin film transistors, and a metal trace. The touch electrode 21 can be disposed in a side of the array substrate 26 close to the liquid crystal layer 27, or disposed in a side of the array substrate 26 away from the liquid crystal layer 27, or disposed in an inner of the array substrate 26.

Optionally, the color filter 28 includes three color resist units, which are a red resist unit, a green resist unit, and a blue resist unit, arranged in an array, and a black matrix disposed between two adjacent color resist units. The color filter 28 is configured to enable the color display of the display panel LC2.

Figure 6:
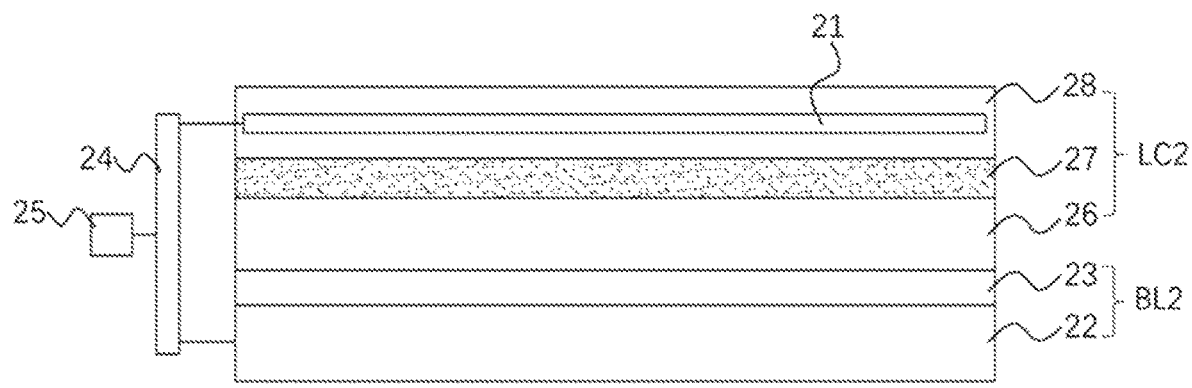
FIG. 6 is a schematic diagram of a touch display device provided in yet another embodiment of the present invention, in which a touch electrode is integrated in the color filter.

In one embodiment of the present invention, referring to FIG. 6, the display panel LC2 is a liquid crystal display panel. The display panel LC2 includes an array substrate 26, a color filter 28 disposed opposite to the array substrate 26, and a liquid crystal layer 27 disposed between the array substrate 26 and the color filter 28.

The touch electrode 21 is integrated in the color filter 28. The backlight module BL2 is disposed at a backside of the display panel LC2 and configured to provide a backlight for the display panel LC2. The backlight module BL2 includes a backlight film 23 and a backlight iron frame 22 configured to support the backlight film 23. The backlight film 23 is disposed between the backlight iron frame 22 and the array substrate 26, and the color filter 28 and the backlight iron frame 22 are respectively disposed at two opposite sides of the array substrate 26. The backlight film 23 includes a light emitting film and a light guide film that are configured to enable the light emitting function and the light guide function of the backlight module BL2. Optionally, the backlight film 23 includes a light guide layer, and the light guide layer includes a light guide plate configured to conduct light and a diffusion plate configured to diffuse light, ensuring that the backlight module BL2 provides uniform and stable light for the display panel LC2. The backlight iron frame 22 can be made of iron or other metal(s). The backlight iron frame 22 is grounded, in order to eliminate the static electricity generated on the surface of the backlight iron frame 22.

The touch electrode 21 and the backlight iron frame 22 are both electrically connected to the touch signal terminal 24. The touch signal terminal 24 is electrically connected to the touch chip 25. The touch chip 25 transmits a touch signal to the touch electrode 21 and the backlight iron frame 22 through the touch signal terminal 24. Preferably, the touch chip 25 simultaneously transmits the same touch signal to the touch electrode 21 and the backlight iron frame 22. It shall be understood that if the same touch signal (e.g., voltage signal) appears on the touch electrode 21 and the backlight iron frame 22, the capacitance coupling effect between the touch electrode 21 and the backlight iron frame 22 will not be generated. That is to say, the risk that a virtual capacitor is formed between the touch electrode 21 and the backlight iron frame 22 is avoided. Since the charging and discharging action in the virtual capacitor triggered by the touch signal is avoided, the touch sensitivity of the touch display device can be assured, and the problem that the noise is generated from the backlight film 23 affected by the periodic electric field can be solved.

Optionally, the array substrate 26 includes a plurality of pixel units that are arranged in an array, a plurality of thin film transistors, and a metal trace.

Optionally, the color filter 28 includes three color resist units, which are a red resist unit, a green resist unit, and a blue resist unit, arranged in an array, and a black matrix disposed between two adjacent color resist units. The color filter 28 is configured to enable the color display of the display panel LC2. The touch electrode 21 can be disposed in a side of the color filter 28 close to the liquid crystal layer 27, or disposed in a side of the color filter 28 away from the liquid crystal layer 27, or disposed in an inner of the color filter 28.

In the touch display device provided in one embodiment of the present invention, the touch electrode 21 and the backlight iron frame 22 are electrically connected to the touch signal terminal 24, ensuring that the touch electrode 21 and the backlight iron frame 22 always have the same voltage, thereby eliminating the capacitance coupling effect between the touch electrode 21 and the backlight iron frame 22, increasing the touch sensitivity of the touch display device, solving the problem that the noise is generated from the backlight film 23 due to the periodic change of the electric field, and improving the quality of the touch display device.

In one embodiment of the present invention, a touch display is also provided. The touch display includes the touch display device described in the above embodiments. The technical features of the touch display device can be referred to the above embodiments, so not repeated herein. It shall be understood that the touch display provided in this embodiment includes the touch display device provided in the above embodiments, and thus has the advantages of the touch display device as described in the above embodiments, i.e., eliminating the capacitance coupling effect between the touch electrode and the backlight iron frame, achieving the effects that the touch sensitivity of the touch display is increased and the vibration noise of the backlight film is reduced, and improving the quality of the touch display.

In the above, the present invention has been described in the above preferred embodiments, but the preferred embodiments are not intended to limit the scope of the present invention, and a person skilled in the art may make various modifications without departing from the spirit and scope of the present invention. The scope of the present invention is determined by claims.

What is claimed is:

1. A touch display device, comprising:
    a touch electrode electrically connected to a touch signal terminal; and
    a backlight module disposed opposite to the touch electrode, wherein the backlight module comprises a backlight film and a backlight iron frame supporting the backlight film, the backlight film is disposed between the touch electrode and the backlight iron frame, and the backlight iron frame is electrically connected to the touch signal terminal;
    wherein the touch signal terminal is configured to transmit a touch signal to the touch electrode and the backlight iron frame, and the touch electrode and the backlight iron frame have a same voltage.

2. The touch display device according to claim 1, wherein the touch signal terminal is configured to transmit a same touch signal to the touch electrode and the backlight iron frame.

3. The touch display device according to claim 1, wherein the touch signal transmitted from the touch signal terminal to the touch electrode and the backlight iron frame is a square-wave signal.

4. The touch display device according to claim 1, wherein the touch signal terminal is electrically connected to a touch chip, and the touch chip is configured to emit the touch signal to the touch signal terminal.

5. The touch display device according to claim 1, wherein the touch display device further comprises a liquid crystal display panel, and the liquid crystal display panel comprises an array substrate, a color filter disposed opposite to the array substrate, and a liquid crystal layer disposed between the array substrate and the color filter; and
    wherein the touch electrode is integrated in the liquid crystal display panel.

6. The touch display device according to claim 5, wherein the touch electrode is integrated in the array substrate.

7. The touch display device according to claim 6, wherein the touch electrode is integrated in a side of the array substrate close to the liquid crystal layer.

8. The touch display device according to claim 6, wherein the touch electrode is integrated in a side of the array substrate away from the liquid crystal layer.

9. The touch display device according to claim 6, wherein the touch electrode is integrated in an inner of the array substrate.

10. The touch display device according to claim 5, wherein the touch electrode is integrated in the color filter.

11. The touch display device according to claim 10, wherein the touch electrode is integrated in a side of the color filter close to the liquid crystal layer.

12. The touch display device according to claim 10, wherein the touch electrode is integrated in a side of the color filter away from the liquid crystal layer.

13. The touch display device according to claim 10, wherein the touch electrode is integrated in an inner of the color filter.

14. The touch display device according to claim 5, wherein the array substrate comprises a plurality of pixel units that are arranged in an array, a plurality of thin film transistors, and a metal trace; and the color filter comprises three color resist units, which are a red resist unit, a green resist unit, and a blue resist unit, arranged in an array, and a black matrix disposed between two adjacent color resist units.

15. The touch display device according to claim 1, wherein the touch electrode comprises one or more touch modules, and each of the touch modules is individually electrically connected to the touch signal terminal.

16. The touch display device according to claim 1, wherein the backlight film comprises a light guide layer, and the light guide layer is configured to conduct or diffuse light emitted from the backlight module.

17. The touch display device according to claim 1, wherein the backlight film comprises a light guide plate configured to conduct light and a diffusion plate configured to diffuse light.

18. The touch display device according to claim 1, wherein the backlight iron frame is grounded.

19. A touch display, comprising:
   a liquid crystal display panel, wherein the liquid crystal display panel comprises an array substrate, a color filter disposed opposite to the array substrate, and a liquid crystal layer disposed between the array substrate and the color filter; and
   a backlight module disposed at a backside of the liquid crystal display panel and configured to provide a backlight for the liquid crystal display panel, wherein the backlight module comprises a backlight film and a backlight iron frame supporting the backlight film, and the backlight film is disposed between the liquid crystal display panel and the backlight iron frame;
   wherein a touch electrode is disposed in the liquid crystal display panel, the touch electrode and the backlight iron frame are electrically connected to a touch signal terminal, and the touch signal terminal is configured to transmit a touch signal to the touch electrode and the backlight iron frame, and the touch electrode and the backlight iron frame have a same voltage.

\* \* \* \* \*